United States Patent Office 3,776,915
Patented Dec. 4, 1973

3,776,915
TETRASILA-ADAMANTANE COMPOUNDS
Cecil L. Frye, Midland, and Jerome M. Klosowski, Monitor Township, Bay County, Mich., assignors to Dow Corning Corporation, Midland, Mich.
No Drawing. Filed Mar. 1, 1972, Ser. No. 230,937
Int. Cl. C07d 103/02
U.S. Cl. 260—293.56
21 Claims

ABSTRACT OF THE DISCLOSURE

The sulfate salts of tetrasila-adamantane compounds in which at least one silicon atom is substituted with a nitrogen-containing radical, such as

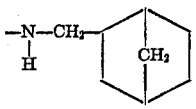

are useful as emulsifiers.

---

This invention relates to novel tetrasila-adamantanes which have at least one nitrogen-containing substituent. In one aspect, the invention relates to new emulsifying agents.

Tetrasila-adamantane compounds can be represented by the structural formula

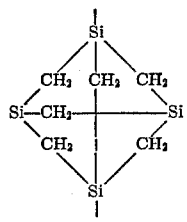

This cage structure, whose four brideghead silicon atoms are tetrahedrally arranged, forms a tetravalent nucleus which can be conveniently represented by the symbol "Ad." The methyl-substituted tetrasila-adamantane, $(CH_3)_4Ad$, has been produced by the pyrolysis of tetramethylsilane at about 650° C.—see Fritz et al., "Carbosilanes," Advances in Inorganic and Radiochemistry, volume 7, page 349, Academic Press (1965). The chlorinated compound, $AdCl_4$, was obtained in very low yield from the high temperature (500° C.) reaction of tetrachlorosilane and trimethylchlorosilane in the presence of aluminum chloride as reported in JACS, 83, 3345 (1961). These compounds are stable to hydrolysis and the utility of such compound is limited; the only reported utility being that of mosquito repellency for the chloro-substituted tetrasila-adamantane compounds. Hydrogen-functional tetrasilia-adamantanes have been synthesized by reduction of the chlorinated compounds—see Sommer, "Stereo-Chemistry, Mechanism and Silicon," McGraw-Hill (1965) at page 156.

Accordingly, it is an object of the present invention to provide novel, useful tetrasila-adamantane compounds.

In accordance with the invention, there are provided 1,3,5,7-tetrasila-adamantane compounds of the general formula

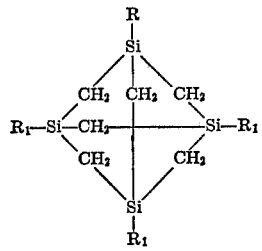

in which R is a nitrogen-containing substituent selected from the group consisting of the $—NR_2'$ radical wherein each R' is independently selected from the group consisting of the hydrogen atom and monovalent hydrocarbon radicals containing from 1 to 18 inclusive carbon atoms, no more than one R' radical being a hydrogen atom; the

radical wherein Q is a divalent hydrocarbon radical containing from 2 to 9 inclusive carbon atoms; the $$—O—Q'—N(R'')_2$$

radical wherein Q' is a divalent hydrocarbon radical containing from 1 to 20 carbon atoms and each R'' is selected from the group consisting of R' radicals and oxygen-substituted monovalent hydrocarbon radicals of no more than 8 carbon atoms containing oxygen in the form of hydroxyl groups; the

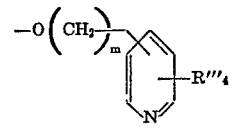

radical in which R''' is independently selected from the group consisting of the hydrogen atom and alkyl radicals containing from 1 to 4 inclusive carbon atoms and $m$ is an integer having a value of 2 or 3; the $+CH_2 \rightarrow_3 NR'''_2$ radical in which each R''' is selected from the group consisting of the hydrogen atom and nonvalent hydrocarbon radicals free of aliphatic unsaturation and containing no more than 8 carbon atoms and the $—ONR'''_2$ radical in which R''' is as defined above; and each $R_1$ substituent is independently selected from the group consisting of the methyl radical and R radicals.

The requisite nitrogen-containing substituent (R) can be of the formula $—NR'_2$ where R' is as defined. The monovalent hydrocarbon radicals include alkyl groups, such as methyl, ethyl, propyl, octyl, and dodecyl; alkenyl groups, such as allyl and hexenyl; cycloaliphatic groups, such as cyclopentyl, cyclohexyl and cyclohexenyl; alkaryl or aralkyl groups such as benzyl and β-phenylethyl; and aryl groups such as phenyl, tolyl and naphthyl. The preferred R' radicals are alkyl radicals containing from 1 to 4 carbon atoms.

Also within the scope of R are

substituents wherein Q is a diavlent hydrocarbon radical such as $$—CH_2CH_2—,\ —CH_2CH_2CH_2—,\ —\overset{CH_3}{\underset{|}{C}}H(CH_2)_6—,$$
$$—(CH_2)_5—,\ —CH_2CH(CH_2)_3—,$$
$$\underset{C_4H_9}{|}$$
$$—CH_2—C(CH_3)_2—(CH_2)_2—C(CH_3)_2—,\ —CH—(CH_2)_4,\ —(CH_2)_2—CH—(CH_2)_7$$
$$\underset{\overset{||}{CH}}{\underset{|}{CH_3}}\quad\underset{C_2H_5}{|}$$

and the like.

When R is a $—O—Q'—N(R'')_2$ substituent, Q' can be any divalent hydrocarbon radical such as $$—CH_2—,\ —(CH_2)_2—,\ —(CH_2)_3—,\ —(CH_2)_6—,\ —\underset{\underset{C_6H_5}{|}}{CH}—\underset{\underset{CH_3}{|}}{C}—,\ —C_{18}H_{36}—,$$

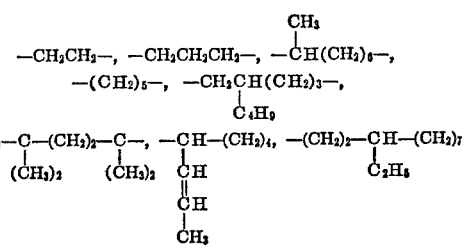

and the like. The preferred Q' radicals are —CH₂CH₂— and —CH₂CH₂CH₂—. In this substituent, R" can be a hydrogen atom, a monovalent hydrocarbon radical such as exemplified by R' or a hydroxyl substituted hydrocarbon radical of no more than 8 carbon atoms. Suitable oxygen substituted hydrocarbon radicals include —CH₂CH₂OH,
CH₂CH(OH)CH₂CH₃,
—CH(CH₃)CH(OH)CH₃,
—CH₂C(CH₃)(OH)CH₂CH₂CH₃,
—CH₂CH(OH)CH₃ and the like.

The R substituents also include radicals of the formula

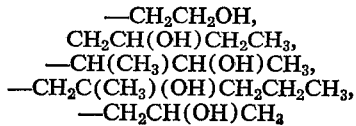

wherein R''' is independently selected from the group consisting of the hydrogen atom and alkyl radicals containing from 1 to 4 inclusive carbon atoms, such as methyl, isopropyl and butyl radicals.

When the nitrogen-containing R substituent is of the formula —(CH₂)₃NR'''₂, the nitrogen atom can be substituted with hydrogen atoms or monovalent hydrocarbon radicals, such as alkyl groups, for example, methyl, ethyl, butyl and octyl radicals; cycloaliphatic groups, for example, cyclopentyl and cyclohexyl radicals; and aryl-containing groups, for example, benzyl, β-phenylethyl, β-phenylpropyl, phenyl, tolyl and xylyl radicals.

Thus, compounds of the invention include (CH₃)₃AdN(C₆H₅), (CH₃)₃AdN(C₅H₁₁)₂, (CH₃)₃AdNH(C₂H₅),
(CH₃)₃AdNC₄H₉(C₆H₅), (CH₃)₃AdN(C₁₁H₂₃)₂,
(CH₃)₃AdN(—C₆H₄—CH₃)₂, (CH₃)₃AdN(C₁₈H₃₇)₂,

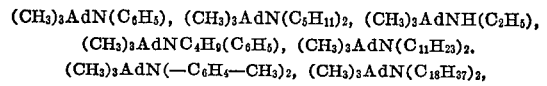

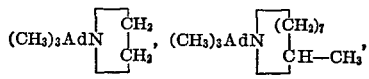

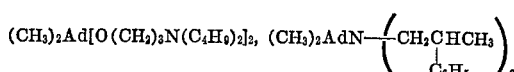

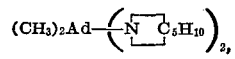

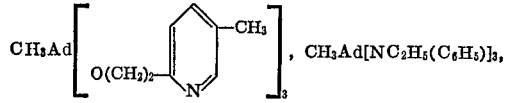

Ad[N(CH₃)₂]₄, (CH₃)₂Ad[OCH₂CH₂NH(CH₂CH₂OH)]₂,
CH₃Ad[OCH₂CH₂CH₂N(CH₂CH₂CH₂OH)₂]₃,
(CH₃)₃AdCH₂CH₂CHNH(C₆H₅), CH₃Ad[CH₂CH₂CH₂N(CH₃)(C₆H₅)]₃,

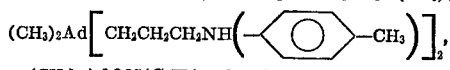

(CH₃)₃AdON(C₂H₅)₂, (CH₃)₂Ad[ONH(C₃H₇)]₂ and the like.

Except for those having —(CH₂)₃NR'''₂ functionality, the tetrasila-adamantanes of the invention are prepared by the reaction of (CH₃)ᵧAdX₄₋ᵧ with RLi compounds in which X is a chlorine or bromine atom and y is an integer having a value of from 0 to 3. The halo-substituted tetrasila-adamantane precursors are most easily obtained by the aluminum halide rearrangement of silmethylene compounds, such as [(CH₃)₃SiCH₂]₂. The rearrangement reaction yields a product mixture of (CH₃)₄Ad, CH₃AdX₃, (CH₃)₂AdX₂, (CH₃)₃AdX and AdX₄, with appreciable amounts of the monohalo product being obtained at catalyst (AlCl₃ or AlBr₃) levels of from 20 to 80 percent by weight based on the weight of silmethylene precursor. The reaction temperatures are relatively low, with temperatures of about 100° C. giving good yields in from 1 to 4 hours. The product mixture can be separated by means of fractional crystallization from pentane or by fractional sublimation if desired. A mixture of (CH₃)₄Ad and (CH₃)ᵧAdX₄₋ᵧ compounds can be used in preparing the nitrogen-containing compounds of the invention since (CH₃)₄Ad is not reactive in the presently described synthesis.

The RLi reactants are readily prepared by reacting reagents, such as methyllithium or butyllithium with the corresponding amines, imines, piperidine and piperidine derivatives, amino alcohols, pyridyl alcohols or hydroxylamines. Exemplary of such nitrogen-containing precursors to the RLi reactants are ethylphenylamine, allylphenylamine, cyclohexylphenylamine, aniline, methylamine, diethylamine, di-2-naphthylamine, dipentylamine, dioctadecylamine, di-2-tolylamine, ethyleneimine, trimethyleneimine, alpha - methylheptamethyleneimine, 2-allylpiperidine, 4-methyl-piperidine, 3-butyl-piperidine, 2,2,6,6-tetramethyl-piperidine, 2-propenyl-piperidine, piperolidine, β-(2-pyridyl)-ethanol, gamma-(4-pyridyl)propanol, β-(4-methylpyridyl-2)-ethanol, β-(6-methylpyridyl)-2-ethanol, β-(3-ethylpyridyl-4)-ethanol, ethanolamine, 2-hydroxyethyl-4-tolylamine, dimethylethanolamine, bis(2-hydroxyethyl)butylamine, 2,2'-dihydroxy - butylethylamine, 2,2'-dihydroxy - 2,2' - dimethyldipentylamine, 2,2',2''-dipropylethylamine, triethanolamine, trispropanolamine, ethylhydroxylamine, diethylhydroxylamine, 1-(hydroxyamino)propane, phenylhydroxylamine and the like.

The reaction of (CH₃)ᵧAdX₄₋ᵧ with RLi can be carried out at from 20 to 100° C. and generally is complete in less than 24 hours at these temperatures. The reaction can be conducted in a solvent, such as ether or hexane. The reaction mixture can be extracted with hydrochloric acid, to obtain the hydrochloric acid salt of the described nitrogen-functional tetrasila-adamantanes. These salts are stable in the dilute acid and the adamantane compounds are easily regenerated by the addition of a base.

The adamantanes containing —(CH₂)₃NR'''₂ functionality can be prepared by the reaction of (CH₃)ᵧAdH₄₋ᵧ with allylamines. The hydrogen-functional tetrasila-adamantane precursors can be obtained from the reduction of the corresponding chloro-substituted adamantane in the presence of lithium aluminum hydride. Suitable allylamine reactants include allylphenylamine, allylcyclohexylamine, allyltolylamine and allylphenylmethylamine. The ≡AdH addition to CH₂=CHCH₂N= is convenienty carried out in a solvent, such as hexane, at reflux temperature. The addition reaction is catalyzed by a platinum compound, such as a platinum halide catalyst.

The salts of the tetrasila-adamantanes of the invention are emulsifying agents and can be utilized to form stable oil-water or water-oil emulsions. Only small amounts of the salts are used in forming stable emulsions and the optimum amount necessary for a particular emulsion can be easily determined by standard techniques.

The salts are readily formed by reaction of the adamantane compounds with dilute acids, such as hydrochloric acid, sulfuric acid, substituted sulfonic acids, hydroiodide, hydrobromide, phosphoric acid, acetic acid and trichloroacetic acid. Quaternary ammonium salts can be obtained by alkylation with agents such as methyliodide, benzyl chloride, dimethylsulfate and methyl phosphate. Thus, the invention includes the anionic forms of the defined tetrasila-adamantanes, for example, chloride, bromide, iodide, sulfate, sulfonate, phosphate, acetic, trichloroacetate, methylsulfate and the like. Such salts can be depicted as (CH₃)ᵧAdR₄₋ᵧ·ZY wherein Y⁻ is an anion and Z is a hydrogen atom or a hydrocarbon radical derived from the alkylating agent, such as a methyl or benzyl group.

The following examples are illustrative, and not to be construed as limiting of the invention which is set forth in the claims.

EXAMPLE 1

Dimethylsilmethylene cyclic trimer (130 grams, 0.61 mole) was added to $AlBr_3$ (22.5 grams, 0.085 mole) in a one-liter, three-neck round bottom flask connected to a gas bag through a cold trap. Upon applying heat, the temperature rose to approximately 100° C., then gradually decreased as the tetramethylsilane was formed. The condenser was allowed to warm and the tetramethylsilane was driven over into the cold trap. After approximately 2 hours, 85 percent of the theoretical amount of tetramethylsilane had been collected and the G.L.C. analysis indicated that no starting material remained. The reaction mixture was then diluted with benzene and acetone was added to quench the catalyst. Washing with water removed most of the catalyst.

The organic layer was washed further with dilute hydrochloric acid, rinsed with water and dried over sodium sulfate. The reaction mixture was distilled and the most volatile portion, $(CH_3)_4Ad$ was sublimed to the head of a spinning band column. The remaining material was a mixture of $(CH_3)_4Ad$, $(CH_3)_3AdBr$ and $(CH_3)_2AdBr_2$. Samples of each were isolated and characterized by mass spectroscopy, infrared and N.M.R.

Dimethylsilmethylene cyclic trimer was reacted in the presence of 27 weight percent $AlCl_3$ following the above-described procedure to give $(CH_3)_3AdCl$ in 18 percent yield.

EXAMPLE 2

Butyllithium (6.25 milliliters of 1.6 molar solution in hexane) was slowly added to $n$-$C_4H_9NH_2$ (1.98 grams) to obtain $n$-$C_4H_9NHLi$. A mixture of $(CH_3)_nAdCl_{4-n}$ which contained approximately 1.8 grams of $(CH_3)_3AdCl$ was reacted with the lithium salt by stirring at room temperature for 24 hours. The reaction mixture was then extracted with a large excess of 5 percent hydrochloric acid to form the salt, $(CH_3)_3AdNH(n$-$C_4H_9)\cdot HCl$. After separation and addition of fresh pentane, addition of sodium hydroxide to the aqueous phase gave $(CH_3)_3AdNH(n$-$C_4H_9)$ which was isolated in 40 percent yield.

By substituting $t$-$C_4H_9NH_2$ for the $n$-$C_4H_9NH_2$ in the above reaction, $(CH_3)_3AdNH(t$-$C_4H_9)$ was obtained.

EXAMPLE 3

Butyllithium (9.8 milliliters of 1.6 molar solution in hexane) was added to piperidine (1.0 milliliter) to form

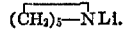

$(CH_3)AdCl$ (1.44 grams) was then added. After 24 hours at room temperature, the reaction was complete as evidenced by periodic G.L.C. analysis. The reaction product was extracted with dilute hydrochloric acid to form the water soluble

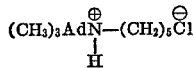

The nearly pure product was then extracted into pentane after adding excess sodium hydroxide to the aqueous phase. Evaporation of the pentane gave

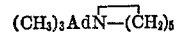

in 51 percent yield.

EXAMPLE 4

Butyllithium (19 milliliters of 1.6 molar solution in hexane) was reacted with $(CH_3)_2NCH_2CH_2OH$ (2.7 grams) to form the desired lithiumalkoxide. A mixture of $(CH_3)_nAdCl_{4-n}$ containing 0.01 mole of $(CH_3)_3AdCl$ was added. After one hour at reflux temperature, approximately 75 percent of the $(CH_3)_3AdCl$ had reacted. Five additional hours at reflux and removal of about one-half the solvent resulted in 95 percent consumption of the $(CH_3)_3AdCl$. After diluting the organic phase with pentane, washing with water and separating the phases, the organic phase was washed with dilute hydrochloric acid to extract the product in the form of the salt,

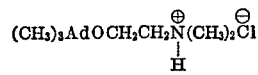

Pentane and solid lithium hydroxide were added to the aqueous phase. After stirring and separation of the layers, $(CH_3)_3AdOCH_2CH_2N(CH_3)_2$, with small amounts of impurities, was present in the organic layer. This purification technique was repeated giving an approximate 50 percent yield of $(CH_3)_3AdOCH_2CH_2N(CH_3)_2$.

EXAMPLE 5

Methyllithium was reacted with diethylamine to give $(C_2H_5)_2NLi$, which in turn was reacted with a mixture of $(CH_3)_4Ad$ and $(CH_3)_3AdBr$. The raction product was extracted and purified by the previously described method to yield $(CH_3)_3AdN(C_2H_5)_2$.

EXAMPLE 6

Butyllithium was reacted with methylamine to give $CH_3NHLi$, which in turn was reacted with $(CH_3)_3AdCl$. The reaction mixture was extracted with hydrochloric acid to obtain $(CH_3)_3AdNH(CH_3)\cdot HCl$ as a crystalline product.

EXAMPLE 7

Sulfate and hydrochloride salts of tetrasila-adamantanes were utilized as emulsifying agents for mixtures of mineral oil and water. In forming the emulsions, 2 grams of mineral oil were mixed with 2 grams of aqueous hydrochloric or sulfuric acid (10 percent solutions) and 0.1 gram of the tetrasila-adamantane compound. The mixture was placed in a small vial and shaken vigorously. For purposes of comparison, amines which were used as precursors to the functional adamantanes were also tested (in the same manner) for effectiveness as emulsifiers. The composition of the compound tested, acid used and stability of the emulsion are given below:

| Number | Composition tested | Acid present | Emulsion characteristics |
|---|---|---|---|
| 1 | $(CH_3)_2NCH_2CH_2OH$ | None | No emulsion formed. |
| 2 | $(CH_3)_2NCH_2CH_2OH$ | $H_2SO_4$ | Do. |
| 3 | $(CH_3)_2NCH_2CH_2OH$ | HCl | Do. |
| 4 | $(CH_3)_2NCH_2CH_2O$-$Ad(CH_3)_3$ | $H_2SO_4$ | Good water-oil emulsion—no change or separation after 10 days. |
| 5 | $(CH_3)_2NCH_2CH_2O$-$Ad(CH_3)_3$ | HCl | Good water-oil emulsion—no change or separation after 10 days (no change or separation was observed in a comparable emulsion after a period of 6 months). |
| 6 | $[(CH_3)_2NCH_2CH_2O]_2Ad(CH_3)_2$ | HCl | Good water-oil emulsion—stable after 10 days. |
| 7 | $(C_4H_9)_2NH$ | HCl | No emulsion. |
| 8 | $(C_4H_9)NH$-$Ad(CH_3)_3$ | HCl | Good water-oil emulsion—no separation after 12 days. |
| 9 | $(C_2H_5)_2NCH_2CH_2O$-$Ad(CH_3)_3$ | HCl | Good water-oil emulsion—stable after 10 days. |
| 10 | $(CH_3)_2NCH_2CH_2OH$ | $H_2SO_4$ | No emulsion formed.[1] |
| 11 | $(CH_3)_2NCH_2CH_2O$-$Ad(CH_3)_3$ | $H_2SO_4$ | Good water-oil emulsion formed—stable for 10 days.[1] |
| 12 | $(C_2H_5)_2NH$ | HCl | No emulsion formed.[1] |
| 13 | $(C_2H_5)_2N$-$Ad(CH_3)_3$ | HCl | Water-oil emulsion stable for a few minutes. |
| 14 | $C_6H_{13}NH_2$ | HCl | No emulsion formed. |
| 15 | $(C_6H_{13})HN$-$Ad(CH_3)_3$ | HCl | Water-oil emulsion stable for a few minutes. |

[1] Trimethylsilyl-terminated dimethylpolysiloxane oil having a viscosity of 1,000 centistokes at 25° C. was substituted for the mineral oil component of the test mixture.

These data demonstrate the effectiveness of the sulfate and hydrochloride salts of the tetrasila-adamantanes as emulsifying agents.

EXAMPLE 8

Two moles of n-C$_4$H$_9$(H)NLi in hexane solvent was reacted with 40 grams (~½ mole of reactive chloride) of a mixture of CH$_3$AdCl$_3$ and AdCl$_4$ at reflux for 24 hours. The reaction mixture was washed with water, extracted with dilute hydrochloric acid into the aqueous phase and then extracted into fresh hydrocarbon solvent by addition of sodium hydroxide. The product, a mixture of

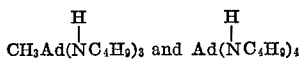

was isolated by distillation of the solvent. A small amount (~6×10$^{-4}$ mole) of this product mixture was added to a mixture containing 2 milliliters of mineral oil, 2 milliliters of water and 0.06 gram (~6×10$^{-4}$) of concentrated hydrochloric acid. Shaking of the mixture gave a water-oil emulsion in the oil phase which was stable for several hours.

It is to be noted that when using tri- or tetrasubstituted adamantanes as emulsifiers only sufficient acid to protonate one or two of the nitrogen atoms is added. The fully protonated salts of such tri- or tetrasubstituted compounds are relatively ineffective as emulsifying agents.

EXAMPLE 9

Lithium aluminum hydride (0.5 gram) was added to 100 ml. of ether and refluxed in a three-necked flask equipped with a condenser for about one hour. A mixture of (CH$_3$)$_4$Ad, (CH$_3$)$_3$AdCl and (CH$_3$)$_3$AdBr (~8.5×10$^{-4}$ mol of AdX compound) in ether was added to the lithium aluminum hydride solution. The mixture was refluxed for 24 hours, after which ether and acetone were added. After refluxing for an additional hour and cooling to about room temperature, the reaction mixture was poured into dilute hydrochloric acid. After separation of the phases, the aqueous phase was again extracted with ether. The solvent was allowed to evaporate to obtain a product containing (CH$_3$)$_3$AdH.

When allylmethylphenylamine is reacted with the (CH$_3$)$_3$AdH product in hexane containing chloroplatinic acid at reflux for about 18 hours, there is obtained (CH$_3$)$_3$AdCH$_2$CH$_2$CH$_2$NCH$_3$(C$_6$H$_5$) as the product.

EXAMPLE 10

A small amount (0.5 gram) of (CH$_3$)$_3$AdOCH$_2$CH$_2$N(CH$_3$)$_2$ was mixed with 3 grams of methyliodide. The quaternization reaction was complete within 30 minutes. The quaternary salt,

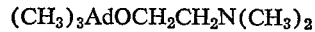

was filtered, washed with hexane and dried to obtain a quantitative yield of the product. The quaternary salt structure was confirmed by N.M.R. analysis. The salt (0.05 gram) was mixed with 2 ml. of water and 2 ml. of mineral oil to form an emulsion which remained stable after one week. For purposes of comparison, dimethylethanolamine and the methyliodide salt thereof were tested as emulsifiers in the above described oil and water mixture. Neither acted as emulsifiers.

Another quaternary salt,

was obtained by mixing (CH$_3$)$_3$AdN(C$_2$H$_5$)$_2$ with a tenfold excess of methyliodide and adding hexane to the mixture to precipitate the product. This salt also acted as emulsifying agent for mineral oil-water mixtures whereas triethylamine and the methyliodide salt thereof had no such effect.

Reasonable modification and variation are within the scope of the invention which is directed to novel tetrasila-adamantane compounds.

That which is claimed is:

1. A tetrasila-adamantane of the formula

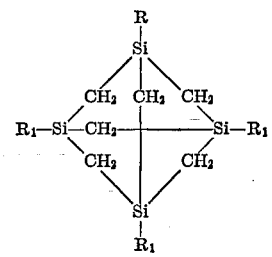

in which R is a nitrogen-containing substituent selected from the group consisting of the —NR'$_2$ radical wherein each R' is independently selected from the group consisting of hydrogen and monovalent hydrocarbon, said hydrocarbon radical being selected from the group consisting of alkyl of 1 to 18 carbon atoms, alkenyl of 3 to 18 carbon atoms, cycloaliphatic of 5 to 6 carbon atoms, alkaryl of 6 to 9 carbon atoms, aralkyl of 6–9 carbon atoms, phenyl and naphthyl, no more than one R' radical being a hydrogen atom; and the

radical wherein Q is a divalent hydrocarbon radical containing from 2 to 9 inclusive carbon atoms; and R$_1$ is independently selected from the group consisting of the methyl radical and R radicals.

2. A compound in accordance with claim 1 wherein the R substituent is of the formula —NR'$_2$.

3. A compound in accordance with claim 2 wherein at least one R$_1$ substituent is a methyl radical.

4. A compound in accordance with claim 3 wherein all of the R$_1$ substituents are methyl radicals.

5. A compound in accordance with claim 4 wherein R' is an alkyl radical containing from 1 to 4 inclusive carbon atoms.

6. A compound in accordance with claim 5 wherein R is a —N(C$_2$H$_5$)$_2$ radical.

7. A compound in accordance with claim 4 wherein R' is a hydrogen atom.

8. A compound in accordance with claim 7 wherein R is a —N(H)C$_4$H$_9$ radical.

9. A compound in accordance with claim 1 wherein R is a

radical.

10. A compound in accordance with claim 9 wherein at least one R$_1$ substituent is a methyl radical.

11. A compound in accordance with claim 10 wherein all of the R$_1$ substituents are methyl radicals.

12. A compound in accordance with claim 11 wherein R is a

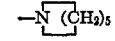

radical.

13. The amine hydrochloride salt of the compound of claim 1.

14. The sulfate salt of the compound of claim 1.
15. The amine hydroiodide salt of the compound of claim 1.
16. The amine hydrobromide salt of the compound of claim 1.
17. The sulfonate salt of the compound of claim 1.
18. The phosphate salt of the compound of claim 1.
19. The acetate salt of the compound of claim 1.
20. The trichloroacetate salt of the compound of claim 1.
21. A quaternary ammonium salt of the compound of claim 1.

References Cited
UNITED STATES PATENTS

| | | | |
|---|---|---|---|
| 3,631,195 | 12/1971 | Frey et al. | 260—448.2 E |
| 3,631,196 | 12/1971 | Klosowski | 260—448.2 D |
| 3,631,197 | 12/1971 | Klosowski et al. | 260—448.2 E |

HENRY R. JILES, Primary Examiner

G. T. TODD, Assistant Examiner

U.S. Cl. X.R.

260—239 A, 239 E, 239 B, 326.61, 448.2 D; 252—357